United States Patent [19]

Bökers et al.

[11] Patent Number: 4,827,063

[45] Date of Patent: May 2, 1989

[54] NUCLEAR REACTOR FUEL ASSEMBLY

[75] Inventors: Franz-Josef Bökers, Fürth; Alexander Steinke, Ebermannstadt, both of Fed. Rep. of Germany

[73] Assignee: Siemens Aktiengesellschaft, Berlin and Munich, Fed. Rep. of Germany

[21] Appl. No.: 100,639

[22] Filed: Sep. 24, 1987

[30] Foreign Application Priority Data

Sep. 25, 1986 [DE] Fed. Rep. of Germany ....... 3632627

[51] Int. Cl.$^4$ ............................................... G21C 3/34
[52] U.S. Cl. ..................................... 376/439; 376/443
[58] Field of Search .............................. 376/439, 443

[56] References Cited

U.S. PATENT DOCUMENTS

| 3,933,584 | 1/1976 | Litt | 376/439 |
| 4,125,434 | 11/1978 | Frömel | 376/439 |
| 4,692,302 | 9/1987 | DeMario | 376/439 |
| 4,728,489 | 3/1988 | Hatfield | 376/439 |

FOREIGN PATENT DOCUMENTS

| 0185219 | 6/1981 | European Pat. Off. . |
| 0148452 | 7/1985 | European Pat. Off. . |
| 1564697 | 1/1970 | Fed. Rep. of Germany . |
| 2198221 | 3/1974 | France . |
| 2578348 | 9/1986 | France . |

Primary Examiner—Donald P. Walsh
Attorney, Agent, or Firm—Herbert L. Lerner; Laurence A. Greenberg

[57] ABSTRACT

A nuclear reactor fuel assembly includes mutually parallel fuel rods and guide tubes for control rods. Two lattice-like spacers have mesh openings formed therein. One of the fuel rods or one of the guide tubes is guided and secured in each of the mesh openings. An additional lattice is secured at least to one of the guide tubes between the two spacers as seen in the longitudinal direction of the fuel rods and the guide tubes. The additional lattice has mesh openings formed therein defining sides of the mesh openings and a smooth and flat surface of the additional lattice in the mesh openings. Turbulence-promoting vanes protrude beyond the sides of the mesh openings formed in the additional lattice. One of the fuel rods is guided with play or one of the guide tubes is guided through each of the mesh openings formed in the additional lattice. Brackets grip the additional lattice between at least one of the fuel rods or the guide tubes at the outside of the fuel assembly.

8 Claims, 2 Drawing Sheets

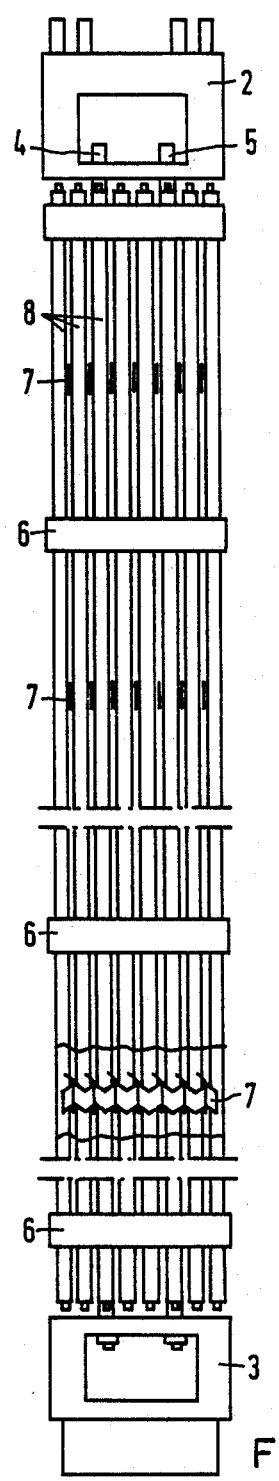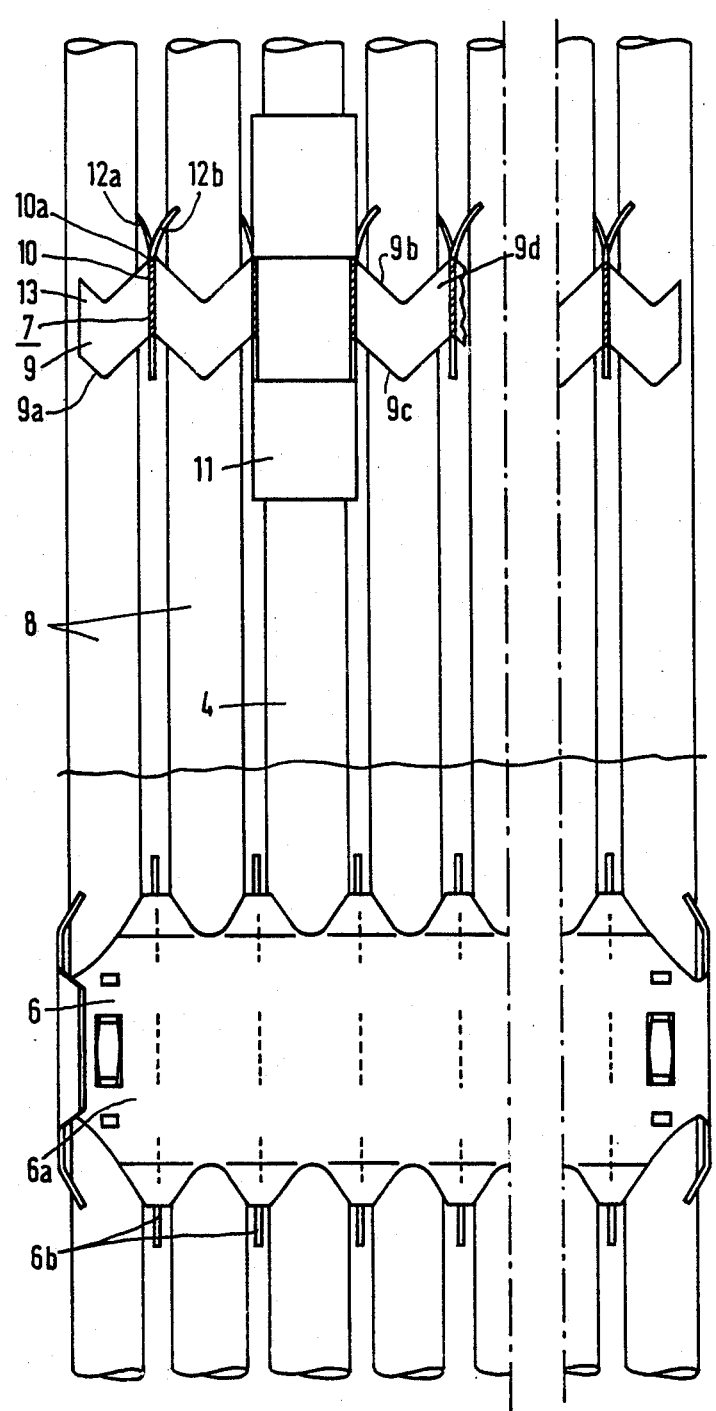
FIG 1
FIG 2

NUCLEAR REACTOR FUEL ASSEMBLY

The invention relates to a nuclear reactor fuel assembly having mutually parallel fuel rods and guide tubes for control rods, two lattice-like spacers with mesh openings through each of which one fuel rod is guided and retained in a force-locking manner or one guide tube is guided and secured, an additional lattice secured at least to one of the guide tubes and disposed between the two spacers as seen in the longitudinal direction of the fuel rods and the guide tubes, the additional lattice having mesh openings, and turbulence-promoting vanes protruding beyond the sides of the mesh openings, one fuel rod being guided with play or one guide tube being guided through each of the mesh openings.

A nuclear reactor fuel assembly of this type is known from European Patent Application No. 0 148 452, corresponding to U.S. Application Ser. No. 567,448, filed Dec. 30, 1983. The additional lattice of this prior art fuel assembly has square mesh openings formed therein and is made of inner sheet-metal ribs that pass through one another at right angles. On the outside of the fuel assembly, the additional lattice has four outer ribs that define a square periphery of the additional lattice and are secured on the inner sheet-metal ribs that are at right angles thereto. The surface of the additional lattice formed by the inner sheet-metal ribs has rigid bearing nubs thereon for the fuel rods in the mesh openings, and each trailing edge of the holes for the fuel rods formed by an inner sheet-metal rib is provided with a single turbulence-promoting vane thereon.

The turbulence-promoting vanes serve to mix the coolant, such as water, that flows longitudinally through the nuclear reactor fuel assembly in a nuclear reactor, for example a pressurized water reactor. Mixing of the coolant is intended to prevent the coolant from being unevenly heated over the cross section of the fuel assembly and to prevent the particular fuel rods of the fuel assembly that are heated to the greatest extent and thus are undergoing the severest stress from being inadequately cooled.

However, the mixing lattice leads to considerable pressure losses in the coolant.

It is accordingly an object of the invention to provide a nuclear reactor fuel assembly, which overcomes the hereinafore-mentioned disadvantages of the heretofore-known devices of this general type and which reduces the pressure losses.

With the foregoing and other objects in view there is provided, in accordance with the invention, a nuclear reactor fuel assembly, comprising mutually parallel fuel rods and guide tubes for control rods, two lattice-like spacers having mesh openings formed therein, one of the fuel rods or one of the guide tubes being guided and secured in each of the mesh openings, an additional lattice secured at least to one of the guide tubes between the two spacers as seen in the longitudinal direction of the fuel rods and the guide tubes, the additional lattice having mesh openings formed therein defining sides of the mesh openings and a smooth and flat surface of the additional lattice in the mesh openings, turbulence-promoting vanes protruding beyond the sides of the mesh openings formed in the additional lattice, one of the fuel rods being guided with play or one of the guide tubes being guided through each of the mesh openings formed in the additional lattice, and brackets gripping the additional lattice between at least one of the fuel rods or the guide tubes at the outside of the fuel assembly.

It has been demonstrated that in this way, uniform heating of the coolant in the nuclear reactor is attained even if the size and/or the number of turbulence-promoting vanes on the spacers is reduced. The spacers may even not have any turbulence-promoting vanes at all, which leads to particularly low pressure losses in the coolant. Spacers that do not have turbulence-promoting vanes can also be manufactured more economically.

In accordance with another feature of the invention, the additional lattice has mutually parallel leading and-/or trailing edges with zig-zag portions, each of the zig-zag portions being compactly disposed in the plane of one of the sides of one of the mesh openings formed in the additional lattice.

In accordance with a further feature of the invention, the additional lattice has mutually parallel leading and-/or trailing edges on which the turbulence-promoting vanes are disposed, each of the edges having ends and being associated with one of the sides of the additional lattice, each two adjacent turbulence-promoting vanes on one of the mutually parallel edges of the additional lattice being twisted in mutually opposite directions about the longitudinal direction of the fuel rods and the guide tubes, located on one of the edges of one of the mesh openings of the additional lattice for a fuel rod, and tapered to a point and protruding beyond the side of the mesh opening associated with the edge at one of the ends of the edge.

This structure produces a more extensive evening out of the temperature of the coolant flowing through the fuel assembly in a nuclear reactor, while at the same time having low pressure losses for the coolant.

In accordance with an added feature of the invention, the additional lattice is spaced apart from the two first-mentioned spacers by unequal distances. As a result, turbulence caused by spacers in the liquid coolant flowing through the fuel assembly in a nuclear reactor calms down, so that the coolant once again flows to the additional lattice in a uniform flow, and the turbulence-promoting vanes of the additional lattice can become optimally effective. A better transfer of heat to the coolant then takes place on the way to the next spacer.

In accordance with a concomitant feature of the invention, the zig-zag portions of the leading and/or trailing edges are mutually staggered.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a highly diagrammatic side-elevational view of a nuclear reactor fuel assembly for a pressurized water reactor;

FIG. 2 is an enlarged longitudinal-sectional view of the nuclear reactor fuel assembly of FIG. 1;

Figure 3:
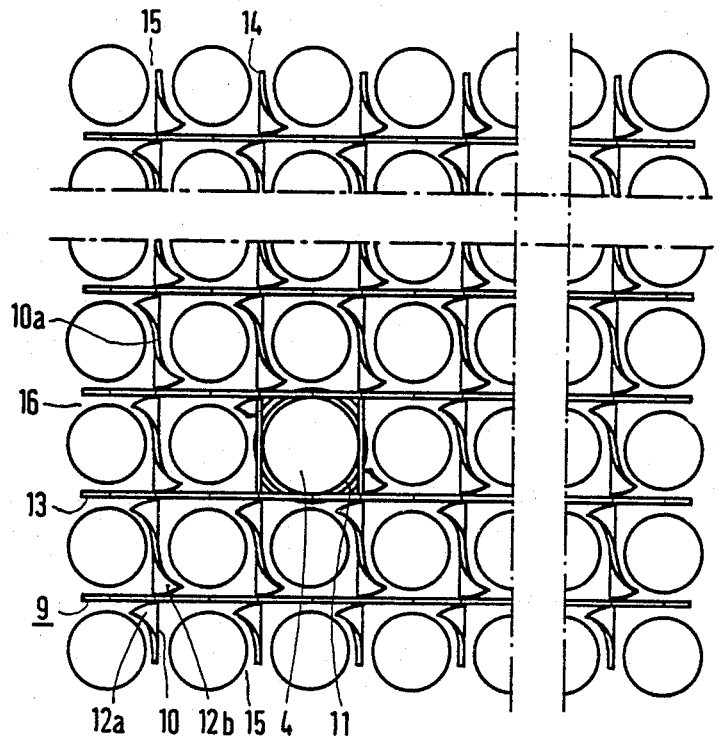
FIG. 3 is a top-plan view, that is a view of the trailing side of the additional lattice of the fuel assembly of FIGS. 1 and 2.

Referring now to the figures of the drawings in detail and first, particularly, to FIG. 1 thereof, there is seen a nuclear reactor fuel assembly intended for a pressurized water reactor having two square retainer plates 2 and 3 made of metal, which are parallel to one another. FIG. 1 also shows two guide tubes 4 and 5 made of metal, each of which accommodates one control rod. The longitudinal axes of the guide tubes pass through the two retainer plates 2 and 3 at an angle of 90° and are each screwed firmly to one of the retainer plates 2 and 3 at each end. Each guide tube 4 and 5 is guided through a square space or mesh opening in square, lattice-like spacers 6 having outer and inner sheet-metal ribs 6a and 6b, which are located along the length of the guide tube 4 between the two retainer plates 2 and 3 and are retained in a force-locking manner, such as by being firmly welded on the guide tubes 4 and 5. A force-locking connection is one which connects two elements together by force external to the elements, as opposed to a form-locking connection which is provided by the shapes of the elements themselves. Fuel rods 8 are guided through each of the other spaces or mesh openings of the spacers 6 and are parallel to the guide tubes 4 and 5. Each fuel rod 8 is substantially formed of a cladding tube filled with nuclear fuel and closed in a gas-tight manner at both ends. The fuel rods 8 are not secured to either of the two retainer plates 2 and 3. Instead, the fuel rods 8 are retained in the spaces or mesh openings of the spacers 6 in an elastic manner, that is in a force-locking manner, by means of non-illustrated springs and rigid bearing nubs of the spacers 6. The fuel rods 8 therefore have play in the direction of the longitudinal axes thereof between the two retainer plates 2 and 3 so that they can expand without hindrance in the longitudinal direction, that is in the longitudinal direction of the fuel assembly. The spacers 6, have no twisted turbulence-promoting vanes protruding beyond the sides of the spaces or mesh openings, particularly on the inner ribs 6b.

The fuel assembly has an additional lattice 7 between each two spacers 6, each of which is unequally spaced apart from the two adjacent spacers 6. The additional lattices 7 have sheet-metal ribs 9 and 10 which pass through each other at right angles and on edge, forming square spaces or mesh openings, each of which accommodates one of the fuel rods 8 or a guide tube 4 or 5.

While the fuel rods 8 are guided in the spaces or mesh openings of the additional lattice 7 in such a way as to be spaced apart from the sheet-metal ribs 9 and 10, that is loosely and with play, a metal sheath 11 is mounted on the guide tubes 4 and 5 by welding on the inside surface to the guide tube 4 or 5. The outer surface of the metal sheath 11 is in turn welded to four sheet-metal ribs 9 and 10 at a time, so as to form the space or mesh opening in the additional lattice 7 in which the guide tube 4 or 5 is located.

Figure 4:
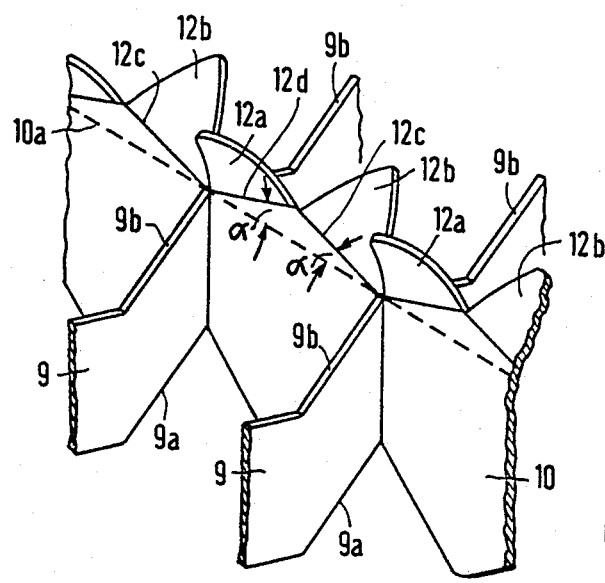
FIG. 4 is a fragmentary perspective view showing turbulence-promoting vanes that can be attached to the additional lattice of the fuel assembly of FIGS. 1-3 or to a spacer of a nuclear reactor fuel assembly.

As FIGS. 2 and 4 show particularly clearly, the ribs 9 that are parallel to one another have leading and trailing edges 9a and 9b, which have zig-zag portions 9c and 9d. The zig-zag portions 9c and 9d are compactly located in the plane of the associated sheet-metal rib 9 and thus of the sides of the spaces or mesh openings of the additional lattice 7 that are formed by the rib 9. The zig-zag portions 9c and 9d of the leading and trailing edges 9a and 9b of the ribs 9 are also parallel to one another. A zig-zag portion 9c having legs of equal length that form an angle of 90° with one another, is located on the leading edge 9a between each two mutually parallel ribs 10. The zig-zag portions 9c are located in such a way as to face the oncoming flow direction for the coolant in a nuclear reactor. A zig-zag portion 9d which also has legs of equal length is disposed on the leading edge 9b of the ribs 9 at each of the ribs 10. One of the legs is disposed on each either side of the associated rib 10, forming an angle of 90° between the two legs. Each of the zig-zag portions 9d is located in the outflow direction of the coolant flwwing through the fuel assembly in a nuclear reactor, so that the zig-zags 9c and 9d of the mutually parallel leading and trailing edges 9a and 9b of the mutually parallel sheet-metal ribs 9 of the additional lattice 7 are staggered with respect to one another.

The mutually parallel ribs 10 of the additional lattice 7 have turbulence-promoting vanes 12a and 12b on mutually parallel trailing edges 10a thereof. Each two turbulence-promoting vanes 12a and 12b which are mounted next to one another face away from one another, as shown in particular in FIG. 4. This is due to the fact that they are twisted about the longitudinal direction of the fuel rods 8 and the guide tubes 4. Each edge of each space or mesh opening of the additional lattice 7 having one fuel rod 8, has two turbulence-promoting vanes 12a and 12b, each of which comes to a point at the end of the edge of the space or mesh opening and protrudes beyond the side of the space or mesh opening associated with this edge. Each side of a space or mesh opening is formed by one rib 10.

As FIG. 4 shows, bending lines or deflection curves 12c and 12d at which the turbulence-promoting vanes 12a and 12b begin to protrude beyond the side of the space or mesh opening of the additional lattice 7, are of equal length and each forms the same angle $\alpha$ with the associated trailing edge 10a of the ribs 10. Both bending lines 12c and 12d, like the turbulence-promoting vanes 12a and 12b, are located on the outside above the trailing edge 10a of the ribs 10.

Turbulence-promoting vanes of this kind may also be located on the mutually parallel leading edge of the ribs 10, which is parallel to the trailing edge 10a.

The ribs 9 and 10 of the additional lattice 7 each have brackets 13 and 14 formed on the two ends thereof, which grip the additional lattice 7 inbetween the fuel rods 8 that are located at outer regions 15 and 16 of the fuel assembly. Furthermore, the sides of the ribs 9 and 10 that form the surface of the additional lattice 7 in the spaces and that are parallel to the longitudinal direction of the fuel rods 8 and the control rod guide tube 4, are advantageously smooth and/or flat (such as by dispensing with bearing nubs). This is done so that they optimally present little resistance to a flow of coolant in the longitudinal direction of the fuel assembly in a nuclear reactor.

The foregoing is a description corresponding in substance to German Application No. P 36 32 627.5, dated Sept. 25, 1986, the International priority of which is being claimed for the instant application, and which is hereby made part of this application. Any material discrepancies between the foregoing specification and the aforementioned corresponding German application are to be resolved in favor of the latter.

We claim:

1. Nuclear reactor fuel assembly, comprising mutually parallel fuel rods and guide tubes for control rods, two lattice-like spacers having mesh openings formed therein, one of said fuel rods or one of said guide tubes being guided and secured in each of said mesh openings, an additional lattice secured at least to one of said guide tubes between said two spacers as seen in the longitudinal direction of said fuel rods and said guide tubes, said additional lattice having mesh openings formed therein defining sides of said mesh openings and a smooth and flat surface of said additional lattice in said mesh openings, turbulence-promoting vanes protruding beyond said sides of said mesh openings formed in said additional lattice, one of said fuel rods being guided with play or one of said guide tubes being guided through each of said mesh openings formed in said additional lattice, and brackets gripping said additional lattice between at least one of said fuel rods or said guide tubes at the outside of the fuel assembly, the mesh openings of the additional lattice, disposed at the outside of the lattice, being open in direction facing away from the fuel assembly.

2. Fuel assembly according to claim 1, wherein said additional lattice has mutually parallel edges with zig-zag portions, each of said zig-zag portions being compactly disposed in the plane of one of said sides of one of said mesh openings formed in said additional lattice.

3. Fuel assembly according to claim 1, wherein said mutually parallel edges are leading and trailing edges.

4. Fuel assembly according to claim 2, wherein said zig-zag portions of said edges are mutually staggered.

5. Fuel assembly according to claim 3, wherein said zig-zag portions of said edges are mutually staggered.

6. Fuel assembly according to claim 1, wherein said additional lattice is spaced apart from said two first-mentioned spacers by unequal distances.

7. Fuel assembly according to claim 1, wherein said additional lattice has mutually parallel edges on which said turbulence-promoting vanes are disposed, each of said edges having ends and being associated with one of said sides of said additional lattice, each two adjacent turbulence-promoting vanes on one of said mutually parallel edges of said additional lattice being:

twisted in mutually opposite directions about the longitudinal direction of said fuel rods and said guide tubes, located on one of said edges of one of said mesh openings of said additional lattice for a fuel rod, and tapered to a point and protruding beyond said side of said mesh opening associated with said edge at one of said ends of said edge.

8. Fuel assembly according to claim 7, wherein said mutually parallel edges are leading and trailing edges.

* * * * *